United States Patent
Ando et al.

(10) Patent No.: US 9,886,226 B2
(45) Date of Patent: Feb. 6, 2018

(54) IMAGE FORMING DEVICE, IMAGE FORMING METHOD, AND NON-TRANSITORY COMPUTER READABLE MEDIUM

(71) Applicant: FUJI XEROX CO., LTD., Minato-ku, Tokyo (JP)

(72) Inventors: Hiromoto Ando, Kanagawa (JP); Chie Ohara, Kanagawa (JP); Yoshimi Uezu, Kanagawa (JP); Satoshi Kamiya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 22 days.

(21) Appl. No.: 14/800,294

(22) Filed: Jul. 15, 2015

(65) Prior Publication Data

US 2016/0233985 A1    Aug. 11, 2016

(30) Foreign Application Priority Data

Feb. 9, 2015  (JP) ................................. 2015-023150

(51) Int. Cl.
*G06F 3/12*    (2006.01)
*G06F 11/30*   (2006.01)
(Continued)

(52) U.S. Cl.
CPC ........ *G06F 3/1287* (2013.01); *G06F 11/3013* (2013.01); *G06F 11/3055* (2013.01);
(Continued)

(58) Field of Classification Search
CPC ......... H04L 1/08; H04L 1/1887; G06F 3/121; G06F 3/1287; G06F 3/1234; G06F 11/3013; G06F 11/3055
See application file for complete search history.

(56) References Cited

U.S. PATENT DOCUMENTS

| 2003/0050080 A1* | 3/2003  | Uchimura  | H04W 4/12 455/466 |
| 2009/0310620 A1* | 12/2009 | Yoshizawa | H04L 12/413 370/461 |
| 2012/0023379 A1* | 1/2012  | Kai       | G06F 11/0727 714/57 |

FOREIGN PATENT DOCUMENTS

| JP | 2003-058345 A | 2/2003 |
| JP | 2010-113505 A | 5/2010 |

OTHER PUBLICATIONS

Cena et al., Factory Communication Systems, 2008. WFCS 2008. IEEE International Workshop on May 21-23, 2008.*

* cited by examiner

*Primary Examiner* — April Y Blair
*Assistant Examiner* — Rong Tang
(74) *Attorney, Agent, or Firm* — Sughrue Mion, PLLC

(57) ABSTRACT

An image forming device that includes a communication device includes a class judging unit, a number-of-times determination unit, and a retry execution unit. The communication device transmits data to a management device through a first communication network provided by a communication carrier. The class judging unit judges a class under which a first error having occurred in data transmission falls, the class being predetermined according to a probability of a successful transmission retry. The number-of-times determination unit determines the number of times a retry is performed in response to the first error, such that the number of times the retry is performed is decreased as the probability of a successful transmission retry becomes low. The retry execution unit causes the communication device to execute the retry in response to the first error the determined number of times.

12 Claims, 9 Drawing Sheets

(51) Int. Cl.
    *H04L 1/18*          (2006.01)
    *G06F 11/32*        (2006.01)
    *G06F 11/14*        (2006.01)

(52) U.S. Cl.
    CPC .......... *G06F 11/327* (2013.01); *H04L 1/1887* (2013.01); *G06F 11/1443* (2013.01)

FIG. 2

| NOTIFICATION TYPE | NOTIFICATION DATA |
|---|---|
| (1) NOTIFICATION FOR STARTING SERVICE | FAILURE ALERT NOTIFICATION |
| | CONSUMABLES LIFE NOTIFICATION |
| | BILLING METER CUTOFF NOTIFICATION |
| (2) NOTIFICATION FOR PERIODIC MONITORING | PERIODIC BILLING METER NOTIFICATION |
| | PERIODIC DIAGNOSIS DATA NOTIFICATION |
| (3) NOTIFICATION FOR PRESENTING COMMUNICATION RESULT TO USER | USER-INSTRUCTION-BASED COMMUNICATION |
| | SOFTWARE VERSION IDENTIFICATION |

FIG. 3

| COMMUNICATION ERROR TYPE | COMMUNICATION ERROR DETAIL |
|---|---|
| (A) ERROR RECOVERABLE IN SHORT TIME | PHONE BUSY-TONE ERROR |
| | DETECTION OF HIGH LOAD ON MANAGEMENT DEVICE |
| (B) ERROR THAT IS RECOVERABLE | COMMUNICATION QUALITY DETERIORATION |
| (C) ERROR THAT IS NOT RECOVERABLE WITHIN SHORT TIME | ERROR NOT CAUSED BY COMMUNICATION ENVIRONMENT |
| | RECEPTION OF INTERNAL ERROR IN MANAGEMENT DEVICE DESPITE SUCCESSFUL COMMUNICATION |
| | POSSIBLE DEVICE MALFUNCTION |
| (D) ERROR THAT IS RECOVERABLE THROUGH COMMUNICATION PATH CHANGE | COMMUNICATION ADAPTER FAILURE |

FIG. 4

| COMMUNICATION TYPE \ COMMUNICATION ERROR TYPE | (A) ERROR RECOVERABLE IN SHORT TIME | (B) ERROR THAT IS RECOVERABLE | (C) ERROR THAT IS NOT RECOVERABLE WITHIN SHORT TIME | (D) ERROR THAT IS RECOVERABLE THROUGH COMMUNICATION PATH CHANGE |
|---|---|---|---|---|
| (1) NOTIFICATION FOR STARTING SERVICE | SHORT PERIOD: 4 TIMES<br>LONG PERIOD: 45 TIMES | SHORT PERIOD: 2 TIMES<br>LONG PERIOD: 45 TIMES | SHORT PERIOD: NIL<br>LONG PERIOD: 45 TIMES | SHORT PERIOD: RETRY USING DIFFERENT COMMUNICATION PATH<br>LONG PERIOD: 45 TIMES |
| (2) NOTIFICATION FOR PERIODIC MONITORING | SHORT PERIOD: 4 TIMES<br>LONG PERIOD: 4 TIMES | SHORT PERIOD: 2 TIMES<br>LONG PERIOD: 4 TIMES | SHORT PERIOD: NIL<br>LONG PERIOD: 4 TIMES | SHORT PERIOD: RETRY USING DIFFERENT COMMUNICATION PATH<br>LONG PERIOD: 4 TIMES |
| (3) NOTIFICATION FOR PRESENTING COMMUNICATION RESULT TO USER | SHORT PERIOD: 2 TIMES<br>LONG PERIOD: NIL | SHORT PERIOD: NIL<br>LONG PERIOD: NIL | SHORT PERIOD: NIL<br>LONG PERIOD: NIL | SHORT PERIOD: RETRY USING DIFFERENT COMMUNICATION PATH<br>LONG PERIOD: NIL |

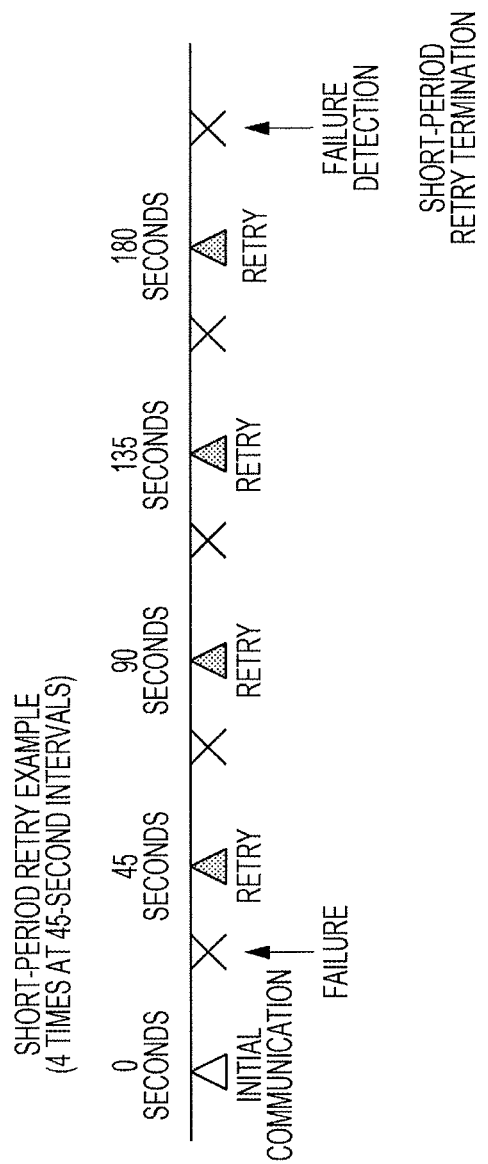

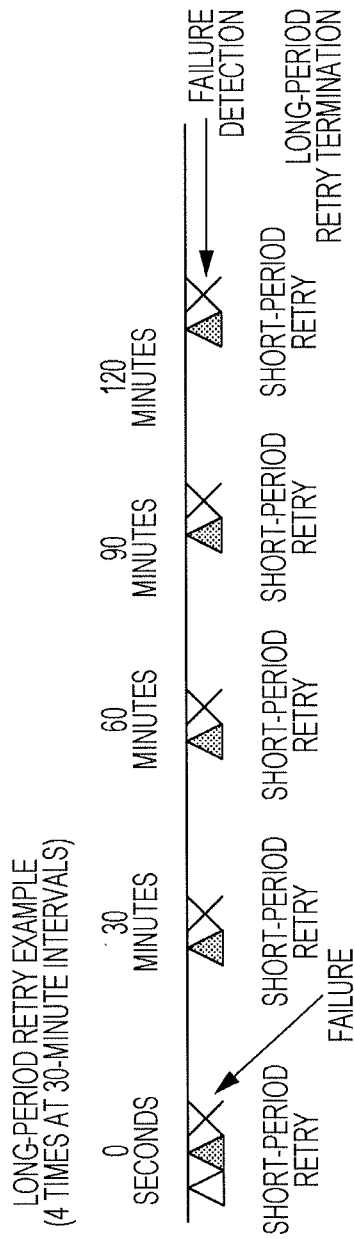

IMAGE FORMING DEVICE, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-023150 filed Feb. 9, 2015.

BACKGROUND

Technical Field

The present invention relates to an image forming device, an image forming method, and a non-transitory computer readable medium.

SUMMARY

According to an aspect of the invention, there is provided an image forming device that includes a communication device, the image forming device including a class judging unit, a number-of-times determination unit, and a retry execution unit. The communication device transmits data to a management device through a first communication network provided by a communication carrier. The class judging unit judges a class under which a first error having occurred in data transmission falls, the class being predetermined according to a probability of a successful transmission retry. The number-of-times determination unit determines the number of times a retry is performed in response to the first error, such that the number of times the retry is performed is decreased as the probability of a successful transmission retry becomes low. The retry execution unit causes the communication device to execute the retry in response to the first error the determined number of times.

BRIEF DESCRIPTION OF THE DRAWINGS

An exemplary embodiment of the present invention will be described in detail based on the following figures, wherein:

FIG. 2 is a table illustrating an example of contents of a notification type list;

FIG. 3 is a table illustrating an example of contents of a communication error type list;

FIG. 4 is a table illustrating an example of contents of a retry operation list;

FIG. 5 is a chart illustrating an example of a retry operation;

FIG. 6 is a chart illustrating an example of a retry operation;

DETAILED DESCRIPTION

An exemplary embodiment of the present invention will be described with reference to the drawings.

Figure 1:
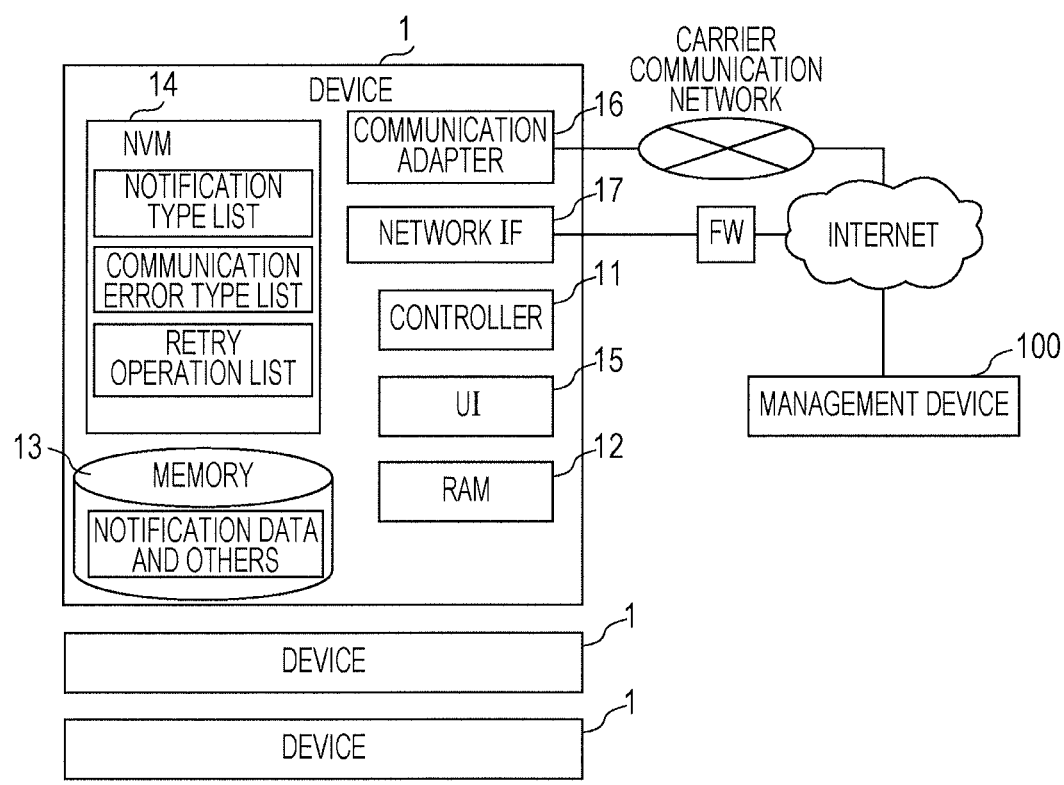
FIG. 1 is a block diagram illustrating a configuration example of an image forming device.

FIG. 1 is a block diagram illustrating a configuration example of an image forming device 1. The image forming device 1 is connected to a communication network provided by a communication carrier (hereinafter, referred to as a carrier communication network) and is also connected to a management device 100 through the carrier communication network and the Internet.

The image forming device 1 includes a controller 11, a random access memory (RAM) 12, a memory 13, a non-volatile memory (NVM) 14, a user interface (UI) 15, a communication adapter 16, and a network interface (IF) 17.

The controller 11 includes a central processing unit (CPU) and executes various computing processes in accordance with a program stored in the memory 13 or the NVM 14. The RAM 12 is utilized as a work memory for the controller 11.

The program may be provided using a computer readable information recording medium such as a compact disc read only memory (CD-ROM) or through a communication network such as the Internet.

The memory 13 is, for example, a hard disk drive (HDD), and the NVM 14 is, for example, a flash memory. The memory 13 and the NVM 14 are used to store data necessary for operation of the controller 11.

The UI 15 includes, for example, a touch panel and has an image displaying function and a location inputting function.

The communication adapter 16 is a communication device that transmits data to the management device 100 through the carrier communication network. The carrier communication network is, for example, a mobile communication network that is held by a mobile communication carrier and through which wireless communication services may be provided.

The network IF 17 is connected to the Internet through a firewall. The image forming device 1 may also transmit data from the network IF 17 to the management device 100 through the Internet.

On designated scheduled date and time, or when a predetermined calling condition is satisfied, the image forming device 1 notifies the management device 100 of information regarding operation of the image forming device 1 (such as a billing meter, consumables, and an error history) through the carrier communication network.

A maintenance and management service provider having the management device 100 uses the notified operation information to provide various services such as billing, automatic consumables-delivery arrangement based on life prediction, and maintenance.

Meanwhile, if retries using the carrier communication network are performed without limitation in response to an error having occurred in notification data transmission in the image forming device 1 including the communication adapter 16 as described above, a charge might increase.

Hence, the image forming device 1 according to the present exemplary embodiment prevents a charge increase by performing an operation described below.

Example of Held Data

Data held in the memory 13 and the NVM 14 will first be described. The memory 13 is used to store notification data and the like to be transmitted to the management device 100. The notification data is operation information such as a billing meter, consumables, and an error history.

The NVM 14 is used to store a notification type list, a communication error type list, and a retry operation list.

In the notification type list, for example, types of the notification data pieces to be transmitted to the management device 100 are classified according to the priority of notification. The notification type list represents what priorities are assigned to the notification data pieces.

In the example illustrated in FIG. 2, the notification types are classified into (1) notification for starting a service, (2) notification for periodic monitoring, and (3) notification for presenting a communication result to a user, in this order from the highest priority. Failure alert notification, consumables life notification, and billing meter cutoff notification are associated with (1) notification for starting a service. Periodic billing meter notification and periodic diagnosis data notification are associated with (2) notification for periodic monitoring. User-instruction-based communication and software version identification are associated with (3) notification for presenting a communication result to a user.

Note that the reason for associating the user-instruction-based communication with (3) notification for presenting a communication result to a user is the following, rather than its low priority. Specifically, if a communication error occurs, notifying the user at that time of the detail regarding the error is more desirable than performing a retry for a successful communication.

In the communication error type list, for example, the detail regarding each of communication errors possibly occurring in notification data transmission is ranked according to the probability of a successful transmission retry, and classes of the probabilities to which the communication errors belong are listed. More specifically, each class is determined depending on, for example, the length of an estimated period until communication recovery.

In the example illustrated in FIG. 3, the communication error types are classified into (A) an error recoverable in a short time, (B) an error that is recoverable, (C) an error that is not recoverable within a short time, and (D) an error that is recoverable through communication path change, in this order from the highest probability of a successful transmission retry (more specifically, from the shortest estimated period until communication recovery). A phone busy-tone error and a detection of a high load on the management device are associated with (A) an error recoverable in a short time. Communication quality deterioration is associated with (B) an error that is recoverable. An error not caused by a communication environment, reception of an internal error in the management device despite a successful communication, and a possible device malfunction are associated with (C) an error that is not recoverable within a short time. A communication adapter failure is associated with (D) an error that is recoverable through communication path change.

The retry operation list, for example, as illustrated in FIG. 4, lists associations among the notification data priority (1, 2, or 3), the class (A, B, C, or D) representing the probability of a successful transmission retry, and the number of times a retry is performed in response to a communication error.

The number of times a retry is performed in response to a communication error is set in such a manner that, for example, the number of times a retry is performed is decreased as the priority of notification data becomes low (that is, approaches 3 among 1 to 3). The number of times a retry is performed in response to a communication error is also set in such a manner that, for example, the number of times a retry is performed is decreased as the probability of a successful transmission retry becomes low (that is, approaches D among A to D).

More specifically, the number of times a retry is performed in response to a communication error is set, for example, in such a manner that a group of retries repeated a predetermined number of times in short periods (hereinafter, the retries repeated in short periods are referred to as short-period retries) is repeated a predetermined number of times in long periods (hereinafter, the retries repeated in long periods are referred to as long-period retries), as illustrated in FIGS. 5 and 6. The term "long" in "long period" and "short" in "short period" are used as lengths relative to each other. The term "short-period retry" is used to refer to a retry repeated a predetermined number of times in short periods, and the example in FIG. 5 illustrates a retry repeated four times at an interval of 45 seconds. The term "long-period retry" is used to refer to a retry repeated a predetermined number of times in long periods, and the example in FIG. 6 illustrates a retry repeated four times at an interval of 30 minutes.

The number of times a retry is repeated in long periods in response to a communication error is set in such a manner that, for example, the number of times a retry is repeated in long periods is decreased as the priority of notification data becomes low (that is, approaches 3 among 1 to 3), as illustrated in FIG. 4. Accordingly, if the number of times a retry is repeated in long periods is increased as the priority of notification data becomes high, notification data may thereby be more reliably transmitted to the management device 100. In addition, if the number of times a retry is repeated in long periods is decreased as the priority of notification data becomes low, unnecessary retries may thereby be prevented.

The number of times a retry is repeated in short periods in response to a communication error is set in such a manner that, for example, the number of times a retry is repeated is decreased as an estimated period until communication recovery becomes long (that is, approaches D among A to D), as illustrated in FIG. 4. Accordingly, if the number of times a retry is repeated in short periods is increased as an estimated period until communication recovery becomes short, a retry may thereby succeed early. In addition, if the number of times a retry is repeated in short periods is decreased as the estimated period until communication recovery becomes long, unnecessary retries may thereby be prevented.

For example, as illustrated in FIG. 4, in a case where the communication error type falls under the class of the lowest probability of a successful transmission retry (more specifically, the class of the longest estimated period until communication recovery, that is, D), a communication path different from the carrier communication network connected to the communication adapter 16 is used to execute a retry in response to the error. The different communication path is, for example, the Internet connected to the network IF 17.

Example of Operation at Communication Start

Figure 7:
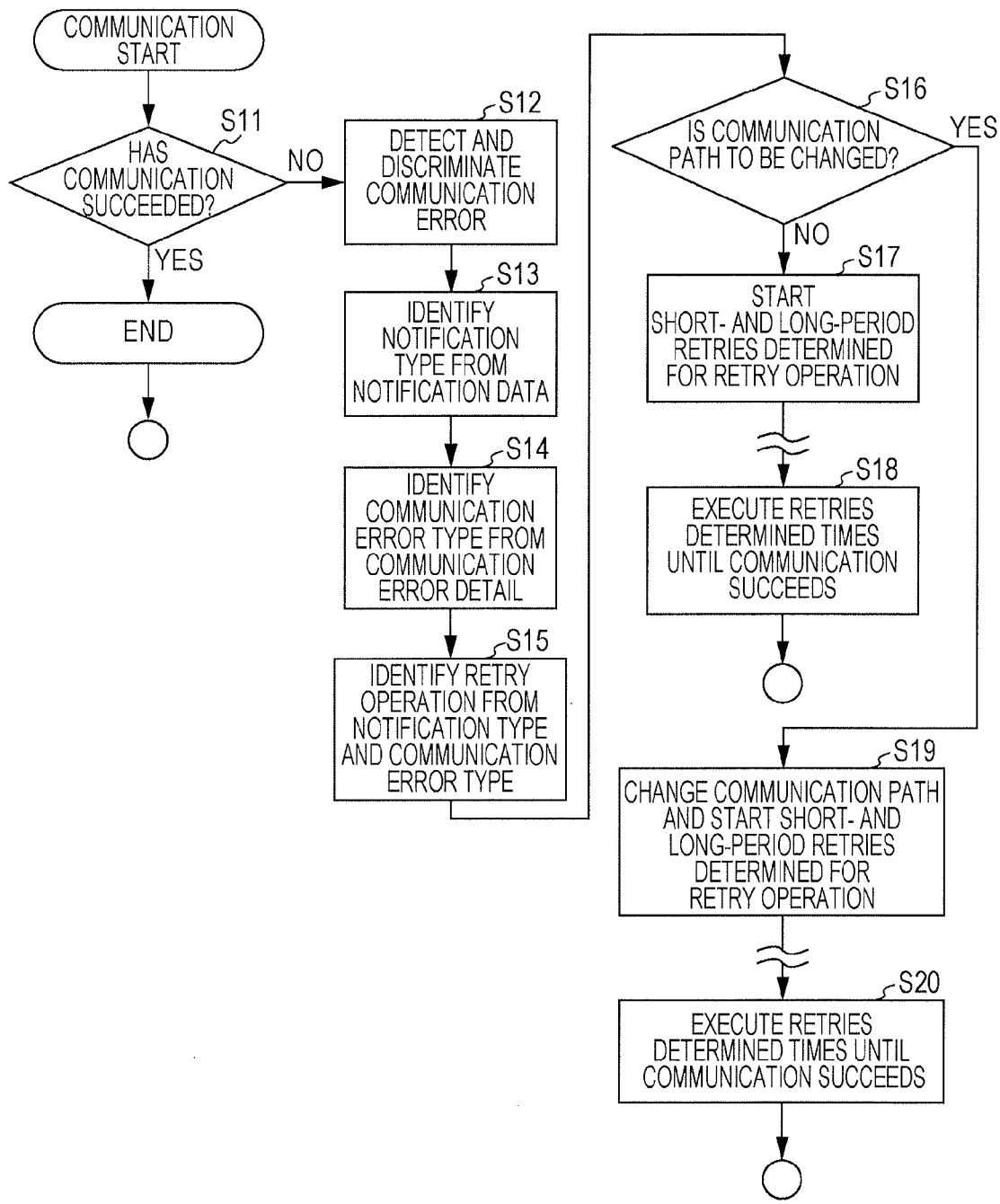
FIG. 7 is a flowchart illustrating an example of operation of the image forming device.

FIG. 7 is a flowchart illustrating an example of operation of the image forming device 1.

After communication for transmitting notification data to the management device 100 is started, the controller 11 judges whether the communication has succeeded (S11). The term "communication" in this processing is used to refer to transmission of notification data from the communication adapter 16 to the management device 100 through the carrier communication network.

If the communication has succeeded (S11: YES), the controller 11 terminates the communication.

If the communication has not succeeded (S11: NO), that is, if a communication error has occurred, the controller 11 detects and discriminates a communication error (S12). As in the example illustrated in FIG. 3, a communication error includes a phone busy-tone error, a high load on the management device, and a communication environment error such as communication quality deterioration. The communication error also includes an error in the management device 100 and an error due to a failure of the communication adapter 16.

The controller 11 identifies a notification type from the notification data by referring to the notification type list (FIG. 2) (S13: an example of functioning as a priority judging unit). Since the notification type is classified according to the priority, identifying the notification type from the notification data leads to identifying the priority of notification data.

The controller 11 identifies a communication error type from the detail regarding the communication error by referring to the communication error type list (FIG. 3) (S14: an example of functioning as a class judging unit). Since the communication error type is classified according to the class representing the probability of a successful transmission retry, identifying the communication error type from the detail regarding the communication error leads to identifying the class of the detail regarding the communication error.

The controller 11 identifies a retry operation from the notification type and the communication error type by referring to the retry operation list (FIG. 4) (S15: an example of functioning as a number-of-times determination unit). The retry operation is set in such a manner that the number of times a long-period retry is performed is decreased as the priority of notification data becomes low and that the number of times a short-period retry is performed is decreased as the estimated period until communication recovery becomes long.

The controller 11 judges whether the identified retry operation is a communication-path changing operation (S16). The case where the retry operation is a communication-path changing operation is a case where, for example, as illustrated in FIG. 4, the communication error type falls under the lowest probability of a successful transmission retry (more specifically, the class of the longest estimated period until communication recovery, that is, D).

If the retry operation is not the communication-path changing operation (S16: NO), the controller 11 starts a short-period retry and a long-period retry the numbers of times of which are predetermined for the retry operation, by using the communication adapter 16 and repeats the execution until the communication succeeds (S17, S18: an example of functioning as a retry execution unit).

If the retry operation is the communication-path changing operation (S16: YES), the controller 11 changes the used communication device from the communication adapter 16 to the network IF 17, starts a short-period retry and a long-period retry the numbers of times of which are determined for the retry operation, and repeats the execution until the communication succeeds (S19 and S20: an example of functioning as a second-network using unit).

Example of Operation During Retry Execution

Figure 8:
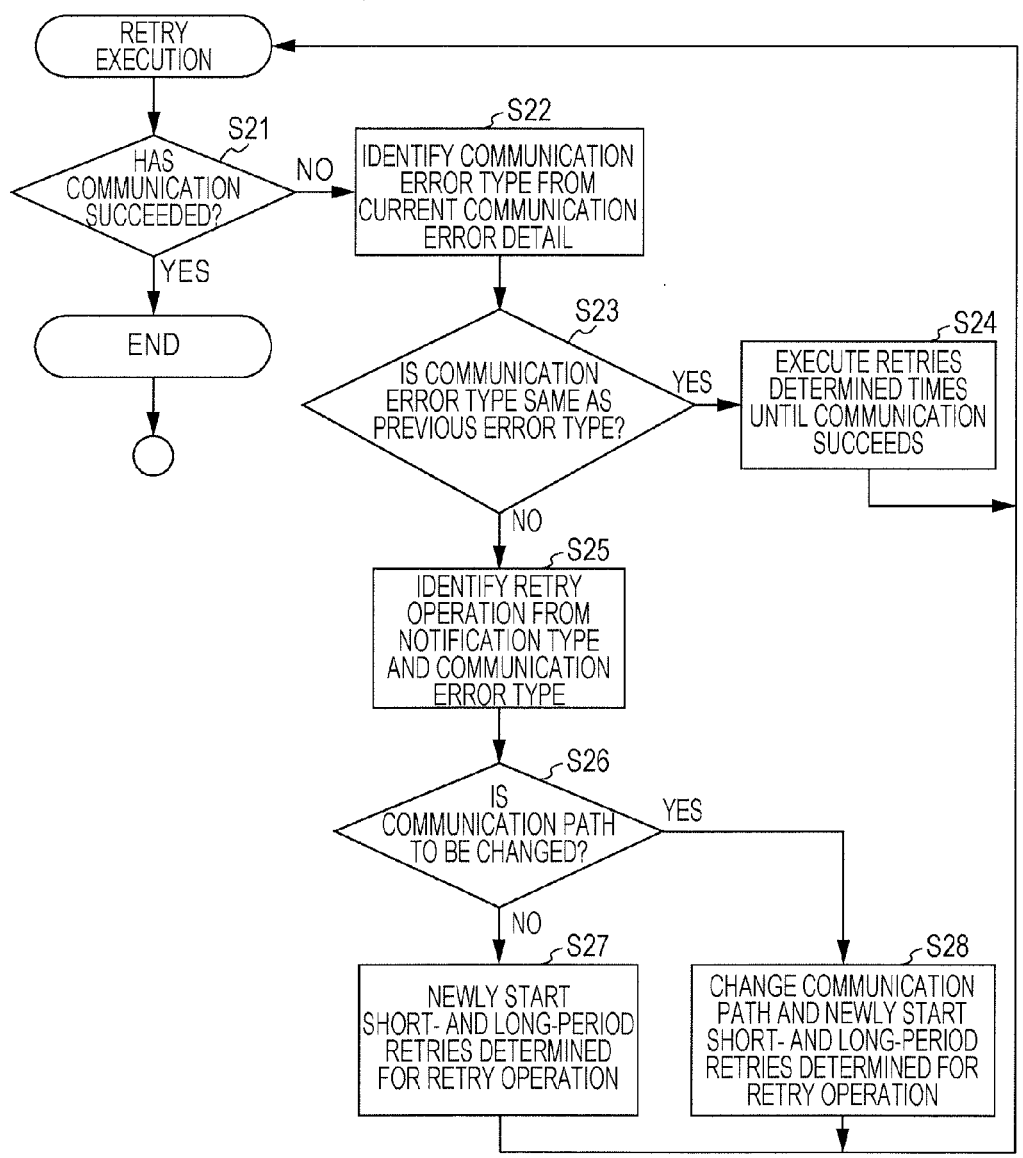
FIG. 8 is a flowchart illustrating an example of operation of the image forming device.
Figure 9:
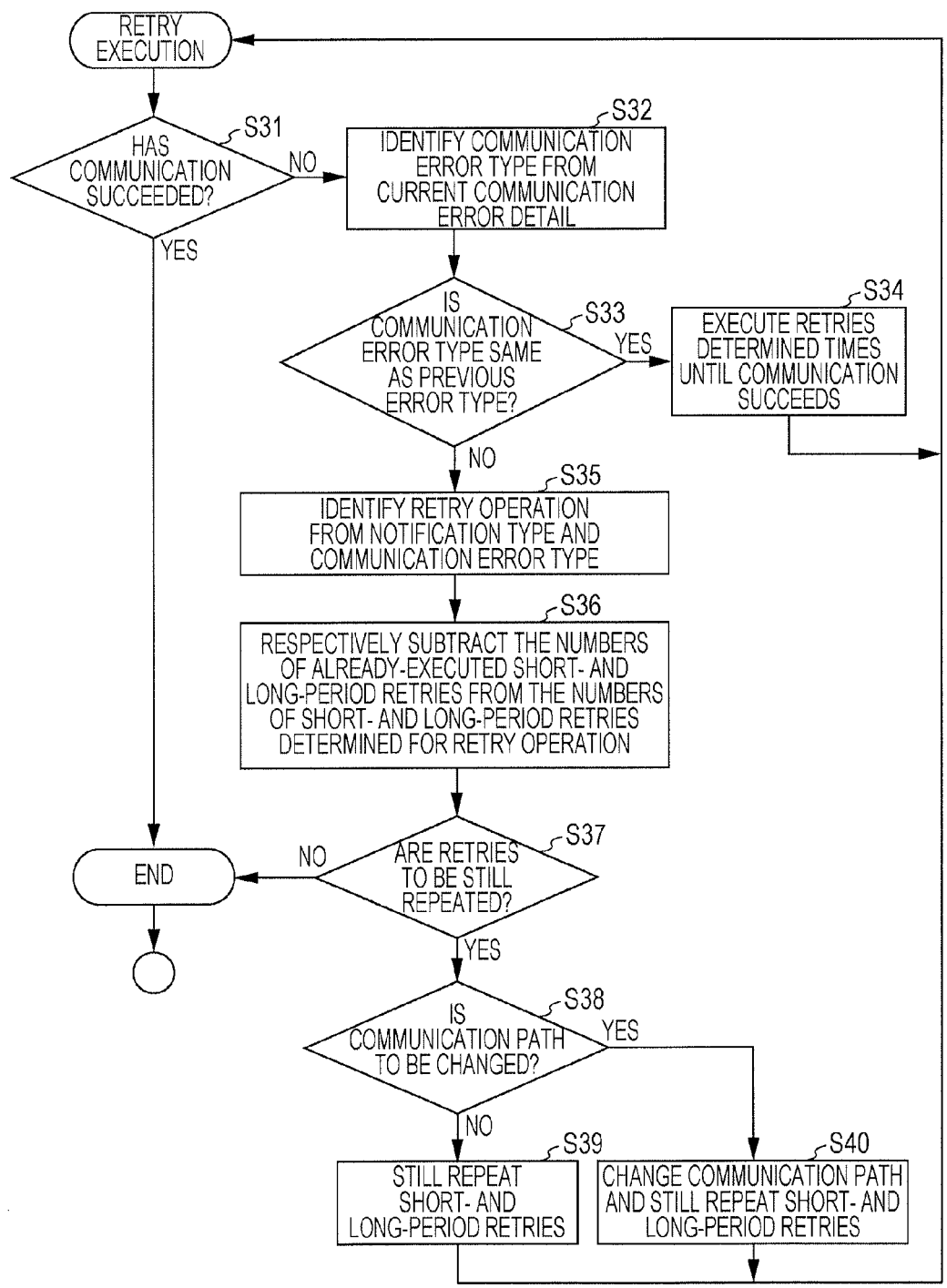
FIG. 9 is a flowchart illustrating an example of operation of the image forming device.
Figure 10:
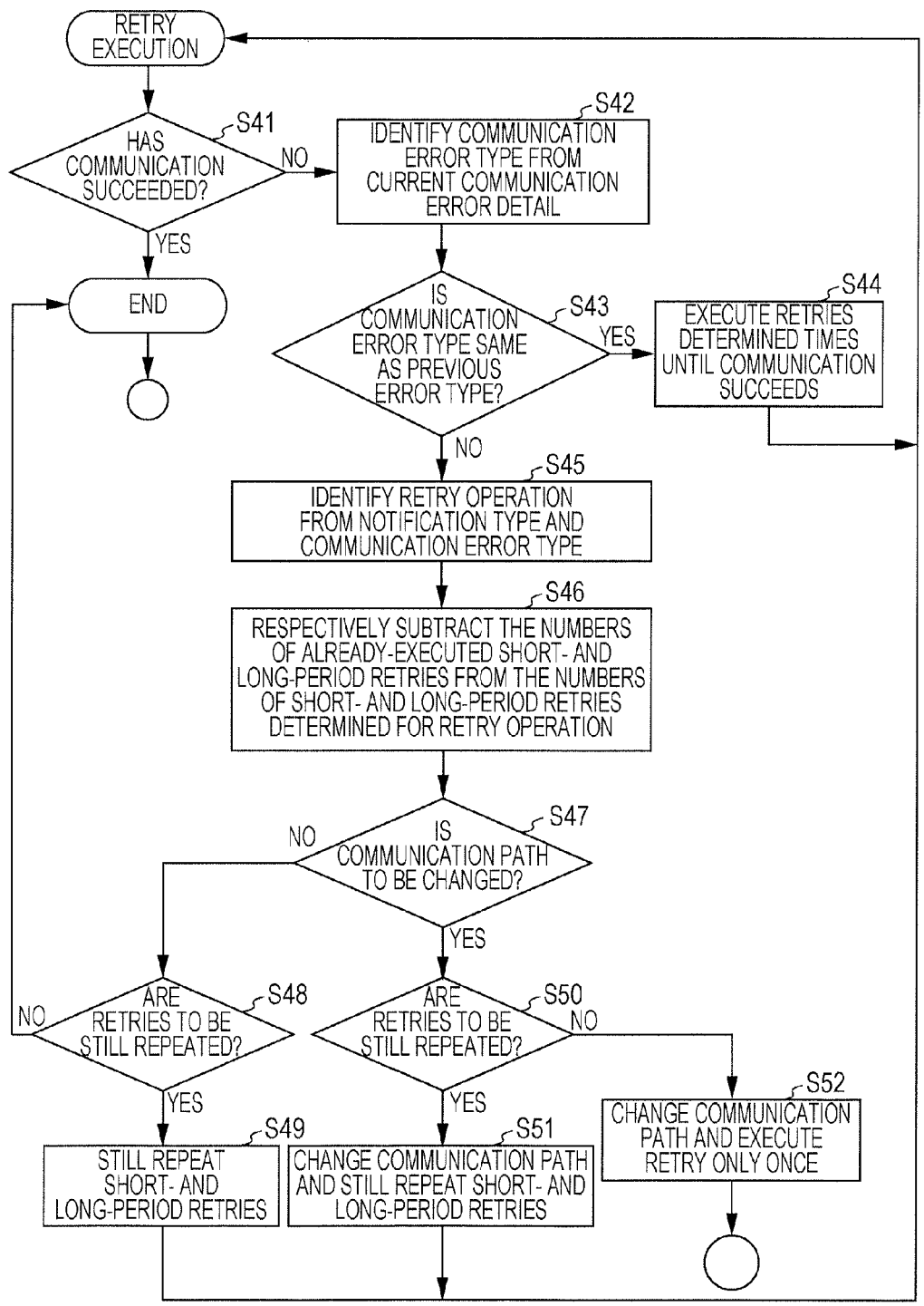
FIG. 10 is a flowchart illustrating an example of operation of the image forming device.

FIGS. 8 to 10 are flowcharts of examples of a first, second, and third operations, respectively, of the image forming device 1 during retry execution.

The first operation example illustrated in FIG. 8 will be described. Upon executing a retry, the controller 11 judges whether the communication has succeeded (S21).

If the communication has succeeded (S21: YES), the controller 11 terminates the communication.

If the communication has not succeeded (S21: NO), that is, if a communication error has occurred, the controller 11 identifies the communication error type from the detail regarding the communication error that has currently occurred by referring to the communication error type list (FIG. 3) (S22).

The controller 11 judges whether the identified communication error type is the same as a previously identified communication error type (S23).

If the communication error type is the same as the previously identified communication error type (S23: YES), the controller 11 still repeats the retry (S24). In other words, the controller 11 executes a short-period retry and a long-period retry, the numbers of times of which are determined for the retry operation identified in S15 described above, until the communication succeeds.

If the communication error type is not the same as the previously identified communication error type (S23: NO), the controller 11 newly identifies a retry operation from the notification type and the communication error type by referring to the retry operation list (FIG. 4) (S25).

If the newly identified retry operation is not the communication-path changing operation (S26: NO), the controller 11 starts a new short-period retry and a new long-period retry the numbers of times of which are determined for the retry operation, by using the communication adapter 16 (S27).

If the newly identified retry operation is the communication-path changing operation (S26: YES), the controller 11 changes the used communication device from the communication adapter 16 to the network IF 17 and starts a short-period retry and a long-period retry the numbers of times of which are determined for the retry operation (S28).

The second operation example illustrated in FIG. 9 will be described. In the example, S31 to S35 correspond to S21 to S25 in the first operation example described above, respectively.

The controller 11 subtracts the number of times a short-period retry has been executed from the number of times the short-period retry is performed that is determined for the newly identified retry operation. The controller 11 also subtracts the number of times a long-period retry has been executed from the number of times the long-period retry is performed that is determined for the newly identified retry operation (S36).

The controller 11 judges whether to still repeat the retry on the basis of each calculated difference (S37). Specifically, if the calculated difference has a positive value, the controller 11 judges that the retry is to be still repeated (S37: YES), and the processing proceeds to S38. If the calculated difference has a value of 0 or a negative value, the controller 11 judges that the retry is not to be still repeated (S37: NO) and terminates the communication.

The newly identified retry operation is not the communication-path changing operation (S38: NO), the controller 11 still repeats the short-period retry and the long-period retry the numbers of times of which correspond to the calculated differences, by using the communication adapter 16 (S39).

If the newly identified retry operation is the communication-path changing operation (S38: YES), the controller 11 changes the used communication device from the communication adapter 16 to the network IF 17 and still repeats the short-period retry and the long-period retry the numbers of times of which correspond to the calculated differences (S40).

The third operation example illustrated in FIG. 10 will be described. In the example, S41 to S49 and S51 correspond to S31 to S40 in the second operation example described above, respectively.

If the newly identified retry operation is the communication-path changing operation (S47: YES), and if the controller 11 judges that the retry is not to be still repeated (S50: NO) because the corresponding calculated difference has a value of 0 or a negative value, the controller 11 changes the used communication device from the communication adapter 16 to the network IF 17 and executes the short-period retry only once (S52).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device including a communication device that transmits data to a management device through a first communication network provided by a communication carrier, the image forming device comprising:
    a class judging unit configured to judge a class under which a first error having occurred in the data transmission falls, the class being predetermined according to a probability of a successful transmission retry;
    a number-of-times determination unit configured to determine a number of times a retry will be performed in response to the first error, such that the number of times the retry will be performed is decreased as the probability of a successful transmission retry becomes low;
    a retry execution unit configured to cause the communication device to execute the retry in response to the first error the determined number of times; and
    a priority judging unit configured to judge priority of the data to be transmitted,
    wherein the priority of the data to be transmitted is judged from a highest priority to a lowest priority by a priority order of notification for starting a service, then notification for periodic monitoring and then notification for presenting a communication result to a user,
    wherein the number-of-times determination unit determines the number of times the retry is performed in response to the first error, such that the number of times the retry is performed is decreased as the probability of a successful transmission retry becomes low and such that the number of times the retry is performed is decreased as the priority becomes low.

2. The image forming device according to claim 1,
    wherein the retry is set such that a group of retries repeated a predetermined number of times in short periods is repeated a predetermined number of times in long periods,
    wherein the class is predetermined according to a length of an estimated period until communication recovery, and
    wherein the number-of-times determination unit determines the number of times the retry is repeated in short periods in response to the first error, the number of times the retry is repeated in short periods being determined such that the number of times the retry is repeated in short periods is decreased as the estimated period until communication recovery becomes long.

3. The image forming device according to claim 1,
    wherein the retry is set such that a group of retries repeated a predetermined number of times in short periods is repeated a predetermined number of times in long periods,
    wherein the class is predetermined according to a length of an estimated period until communication recovery, and
    wherein the number-of-times determination unit determines the number of times the retry is repeated in short periods in response to the first error, the number of times the retry is repeated in short periods being determined such that the number of times the retry is repeated in short periods is decreased as the estimated period until communication recovery becomes long, and the number-of-times determination unit determines the number of times the retry is repeated in long periods in response to the first error, the number of times the retry is repeated in long periods being determined such that the number of times the retry is repeated in long periods is decreased as the priority becomes low.

4. The image forming device according to claim 1, further comprising:
    a second-network using unit that executes the retry in response to the first error by using a second communication network different from the first communication network in a case where the first error falls under a lowest class of the probability of a successful transmission retry.

5. The image forming device according to claim 1,
    wherein in a case where the retry causes a second error different from the first error, the number-of-times determination unit determines a number of times a retry is performed in response to the second error, and
    wherein the retry execution unit causes the communication device to execute the retry in response to the second error the determined number of times.

6. The image forming device according to claim 1,
    wherein in a case where the retry causes a second error different from the first error, the number-of-times determination unit determines the number of times a retry is performed in response to the second error, and
    wherein the retry execution unit causes the communication device to execute the retry in response to the second error the number of times obtained by subtracting the number of times the retry has been executed from the determined number of times.

7. The image forming device according to claim 4,
    wherein in a case where the retry causes a second error different from the first error, the number-of-times determination unit determines the number of times a retry is executed in response to the second error, and
    wherein even if the number of times obtained by subtracting the number of times the retry has been executed from the determined number of times has a negative value, the second-network using unit executes at least one time the retry using the second communication network in response to the second error.

8. An image forming method for an image forming device including a communication device that transmits data to a management device through a communication network provided by a communication carrier, the image forming method comprising:

judging a class under which a first error having occurred in the data transmission falls, the class being predetermined according to a probability of a successful transmission retry;

determining a number of times a retry will be performed in response to the first error, such that the number of times the retry will be performed is decreased as the probability of a successful transmission retry becomes low;

causing the communication device to execute the retry in response to the first error the determined number of times; and judging a priority of the data to be transmitted, wherein the priority of the data to be transmitted is judged from a highest priority to a lowest priority by a priority order of notification for starting a service, then notification for periodic monitoring and then notification for presenting a communication result to a user, wherein the number of times the retry is performed in response to the first error is determined such that the number of times the retry is performed is decreased as the probability of a successful transmission retry becomes low and such that the number of times the retry is performed is decreased as the priority becomes low.

9. A non-transitory computer readable medium storing a program causing a computer to execute a process, the computer including a communication device that transmits data to a management device through a communication network provided by a communication carrier, the process comprising:

judging a class under which a first error having occurred in the data transmission falls, the class being predetermined according to a probability of a successful transmission retry;

determining a number of times a retry will be performed in response to the first error, such that the number of times the retry will be performed is decreased as the probability of a successful transmission retry becomes low;

causing the communication device to execute the retry in response to the first error the determined number of times; and judging a priority of the data to be transmitted, wherein the priority of the data to be transmitted is judged from a highest priority to a lowest priority by a priority order of notification for starting a service, then notification for periodic monitoring and then notification for presenting a communication result to a user, wherein the number of times the retry is performed in response to the first error is determined such that the number of times the retry is performed is decreased as the probability of a successful transmission retry becomes low and such that the number of times the retry is performed is decreased as the priority becomes low.

10. The image forming device according to claim 1, wherein the notification for starting the service relates to an amount of consumables in the image forming device.

11. The image forming method according to claim 8, wherein the notification for starting the service relates to an amount of consumables in the image forming device.

12. The process according to claim 9, wherein the notification for starting the service relates to an amount of consumables in the image forming device.

* * * * *